(12) United States Patent
Cowan et al.

(10) Patent No.: US 6,648,035 B1
(45) Date of Patent: Nov. 18, 2003

(54) PRESSURIZED CONTAINER ADAPTER FOR CHARGING AUTOMOTIVE SYSTEMS

(75) Inventors: David M. Cowan, Brooklyn, NY (US); Jochen Schapers, New York, NY (US); Saul Trachtenberg, New York, NY (US); Nikolay V. Nikolayev, Flushing, NY (US)

(73) Assignee: Interdynamics, Inc., Brooklyn, NY (US)

( * ) Notice: Subject to any disclaimer, the term of this patent is extended or adjusted under 35 U.S.C. 154(b) by 0 days.

(21) Appl. No.: 10/403,444

(22) Filed: Mar. 31, 2003

Related U.S. Application Data

(62) Division of application No. 10/032,980, filed on Dec. 28, 2001, now Pat. No. 6,539,988.

(51) Int. Cl.⁷ .................................................. B65B 1/04
(52) U.S. Cl. ..................... 141/352; 141/351; 141/67; 141/329; 251/149.1; 222/5; 222/81
(58) Field of Search .................................. 141/2, 18, 19, 141/67, 329, 330, 349–354, 383, 384, 382, 386; 137/614.03, 614.04; 251/149, 149.1, 149.2; 222/5, 80, 81–83.5

(56) References Cited

U.S. PATENT DOCUMENTS

| | | | | | |
|---|---|---|---|---|---|
| 4,765,367 A | * | 8/1988 | Scott | ........................ | 137/607 |
| 6,019,145 A | * | 2/2000 | Savidge | ..................... | 141/38 |
| 6,283,172 B1 | * | 9/2001 | Thurner | ...................... | 141/38 |
| 6,539,988 B1 | * | 4/2003 | Cowan et al. | ............... | 141/67 |

* cited by examiner

Primary Examiner—Steven O. Douglas
(74) Attorney, Agent, or Firm—Levisohn, Berger & Langsam, LLP (57) ABSTRACT

A dispensing adapter for connecting pressurized containers to other valved systems such as automobile air conditioners is provided. The housing has a dispensing end, a receiving end, and an interior volume communicating between the dispensing end and the receiving end. The receiving end sealingly engages a first valve of a pressurized container, and the dispensing end sealingly engages a second valve such as a service port of an automobile air conditioner. A reciprocatable core depressor is disposed inside the housing. When dispensing end is attached to the service port, the core depressor is moved toward the receiving end of the housing, and the proximal end of the core depressor engages a stem of the first valve and opens the first valve. The housing maybe angled or straight, and the core depressor may have a piercing pin to open puncture valve containers.

12 Claims, 8 Drawing Sheets

PRESSURIZED CONTAINER ADAPTER FOR CHARGING AUTOMOTIVE SYSTEMS

RELATED APPLICATIONS

This is a divisional application of U.S. patent application Ser. No. 10/032,980 filed Dec. 28, 2001, now U.S. Pat. No. 6,539,988 which issued on Apr. 1, 2003.

BACKGROUND OF THE INVENTION

1. Field of the Invention

The invention relates to fluid flow devices for dispensing fluids (i.e., liquids and gases) from pressurized containers. More specifically, the invention relates to attachments for easily connecting pressurized containers containing fluids to automobile air conditioner systems.

2. Description of the Related Art

Automotive systems frequently require maintenance such as the addition of various chemicals which may degrade or escape slowly with time and use. A need to dispense chemicals to automotive housings such as air conditioning units, motors, and the like is well known. Conventionally, a consumer may purchase these chemicals in a sealed pressurized container that is provided with a valve. The container valve may have a spring-biased stem which, when depressed, opens and allows the chemicals to egress from the container via the stem. Alternatively, the container valve may be of the type that needs to be punctured to release the chemicals inside (after which it is typically not re-sealable). The chemicals are introduced into the automotive system via a hose having a standard SAE brass fitting at one end which connects to a service port on the automobile and a brass cap at the other which is adapted to fit on top of the valve of the dispensing container. The brass valve at the container end of the hose normally includes a piercing pin which pierces the container valve or causes the stem of the container valve to be opened when the brass section is placed on top of the container. The conventional hose allows the service port fitting end to be moved about and easily placed on the automotive service port.

The conventional connector hose suffers from several drawbacks. First, the hose is flexible; as a result, it can be difficult to handle and is generally unwieldy. Moreover, the connector hose has three main sections (two brass fittings and the hose) and has a not insignificant manufacturing cost associated therewith. Further, if a consumer wishes to or needs to use the connector hose on more than one container during a single use, it is difficult to interchange between various containers, typically because some of the chemicals from an emptied container linger inside the hose. As a result, the chemicals tend to drip out of the hose when the hose is disconnected from an empty container.

SUMMARY OF THE INVENTION

Accordingly, it is an object of the invention to provide a universal device for conveying chemicals from a plurality of valved system that is easy to use and inexpensive to manufacture.

It is another object of the invention to provide a device for conveying chemicals into automobile systems in a non-messy manner.

It is another object of the invention to provide a device which insures the complete emptying of a can of chemicals into another system.

It is another object of the invention to provide a device which can be easily attached to service ports in a variety of orientations.

The above and other objects are fulfilled by the invention, which is a dispensing adapter for pressurized containers. The housing is provided with a dispensing end, a receiving end, and an interior volume communicating between the dispensing end and the receiving end. The receiving end is adapted to sealingly engage a first valve of an aerosol can, and the dispensing end is adapted to sealingly engage a second valve, preferably a valve of an automotive system, more preferably a valve in a service port for an automobile air conditioning system. A reciprocatable core depressor is movably disposed in the interior volume and has a proximal end disposed closer to the receiving end and a distal end disposed closer to the dispensing end. When the core depressor is moved toward the receiving end of the housing, the proximal end of the core depressor engages a stem of the first valve and opens the first valve. Preferably, when the dispensing end of the housing is attached to the second valve, the second valve engages the distal end of the core depressor, and the core depressor is moved toward the receiving end of the housing. As mentioned above, the second valve is preferably an automobile air conditioner service port and has a port valve stem. When the housing is attached to both the first and second valves, the core depressor engages the port valve stem at the distal end, and the core depressor engages the pressurized valve stem at the proximal end.

The receiving end preferably includes a positive lock grasping the pressurized can, which can take the form of a lip which frictionally engages a shoulder of the pressurized can.

The core dispenser preferably includes longitudinal fluid flow grooves. When the first valve is opened, at least part of the fluid in the pressurized can exits the can, travels at least partially along the longitudinal fluid flow grooves, and exits the housing via the dispensing end.

In the preferred embodiment, the receiving end is substantially flat and the housing is angled with respect to the receiving end, preferably at approximately 45° with respect to the receiving end. Alternatively, the housing may be substantially straight. As another alternative, the core depressor may include a piercing pin so that the invention is usable on containers having that form of valve (i.e., the type that needs to be pierced).

The invention relates to a plastic direct dispensing device adapted to be used in the automotive after market environment in which a chemical is carried in a container, preferably under pressure, which is released when a valve on top of the container is opened and the contents of the container are propelled into an automotive system through a port having a valve. The invention opens both valves in the container and in the port when the invention is properly used.

The present invention provides a very easy snap on dispenser which is adapted to open valves at both the dispensing and receiving end through a simple manual positive force. A lip is provided at the receiving end to grasp onto a conventional container and a mating tapered surface provided at the dispensing end to easily grab onto the general port construction found in most automobile engines or receptacle locations. The container can easily be cleaned, washed, cleaned, used for different cans and otherwise makes the ability to dispense fluids so much easier, quicker, neater and less expensive than anything previously employed.

Additionally, the device is preferably angled so that a can will be completely emptied even if the port is not easily accessible. By angling the device and having the fluid flow downhill at a 45° angle into the fluid receptacle reservoir of the automobile, the can will be completely emptied.

The invention is preferably made of a few plastic parts snapped together in a simple construction. Its cost is much lower than that of the conventional hose. The invention has widespread utility and universality, and it represents a significant benefit over prior dispensing hoses commonly employed in the automotive and aftermarket industry.

In the case of the preferred embodiment, the device is adapted to be attached to an automobile air conditioner low pressure service port. The chemicals in question to be added to the air conditioner include refrigerant, lubricant, performance booster, leak detector, and any other chemicals known to be addable to an air conditioning system.

DETAILED DESCRIPTION OF THE PREFERRED EMBODIMENTS

Description of the invention will now be given with reference to FIGS. 1–8. It should be noted that these figures are merely exemplary and are not meant, in any way, to limit the scope of the invention, which is defined by the claims appearing below.

Figure 1:
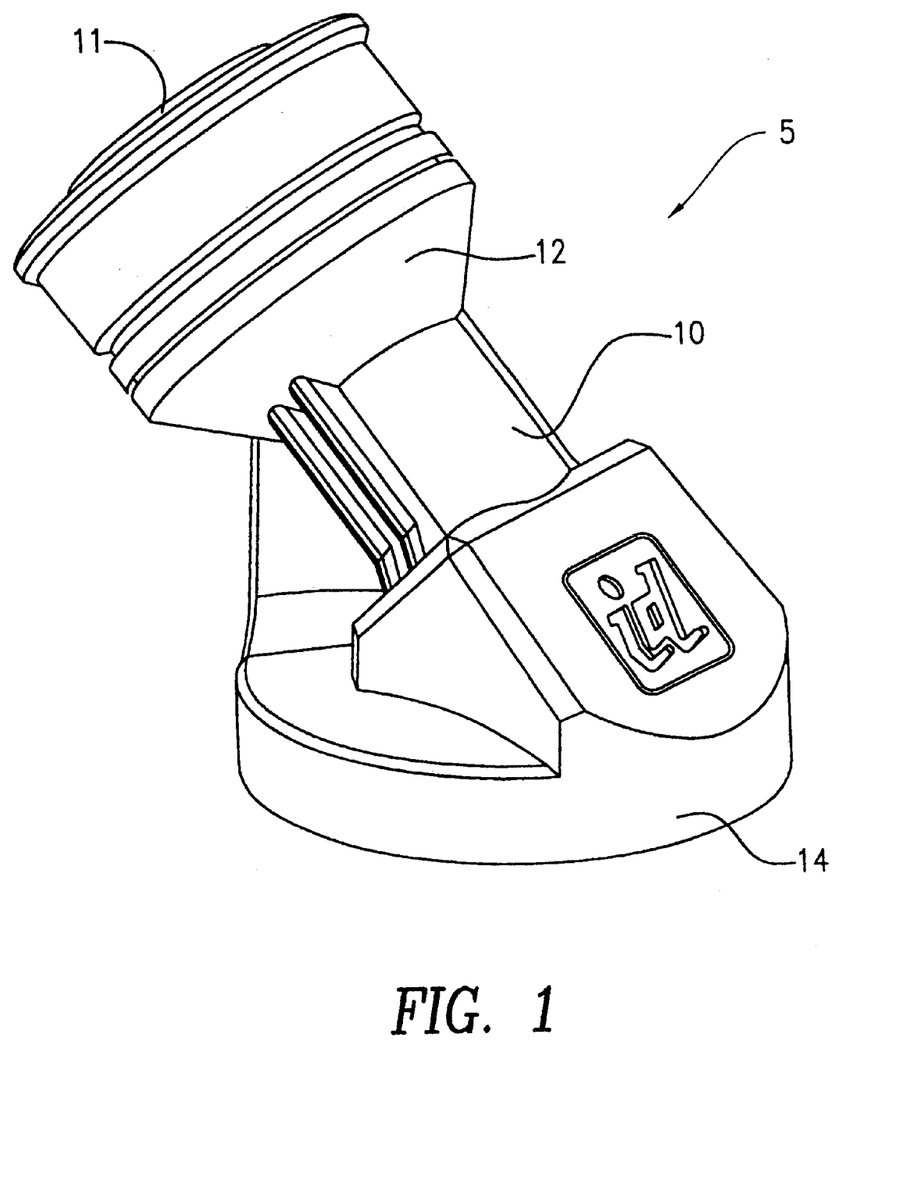
FIG. 1 is a side perspective view of a container adapter in accordance with the invention.
Figure 2:
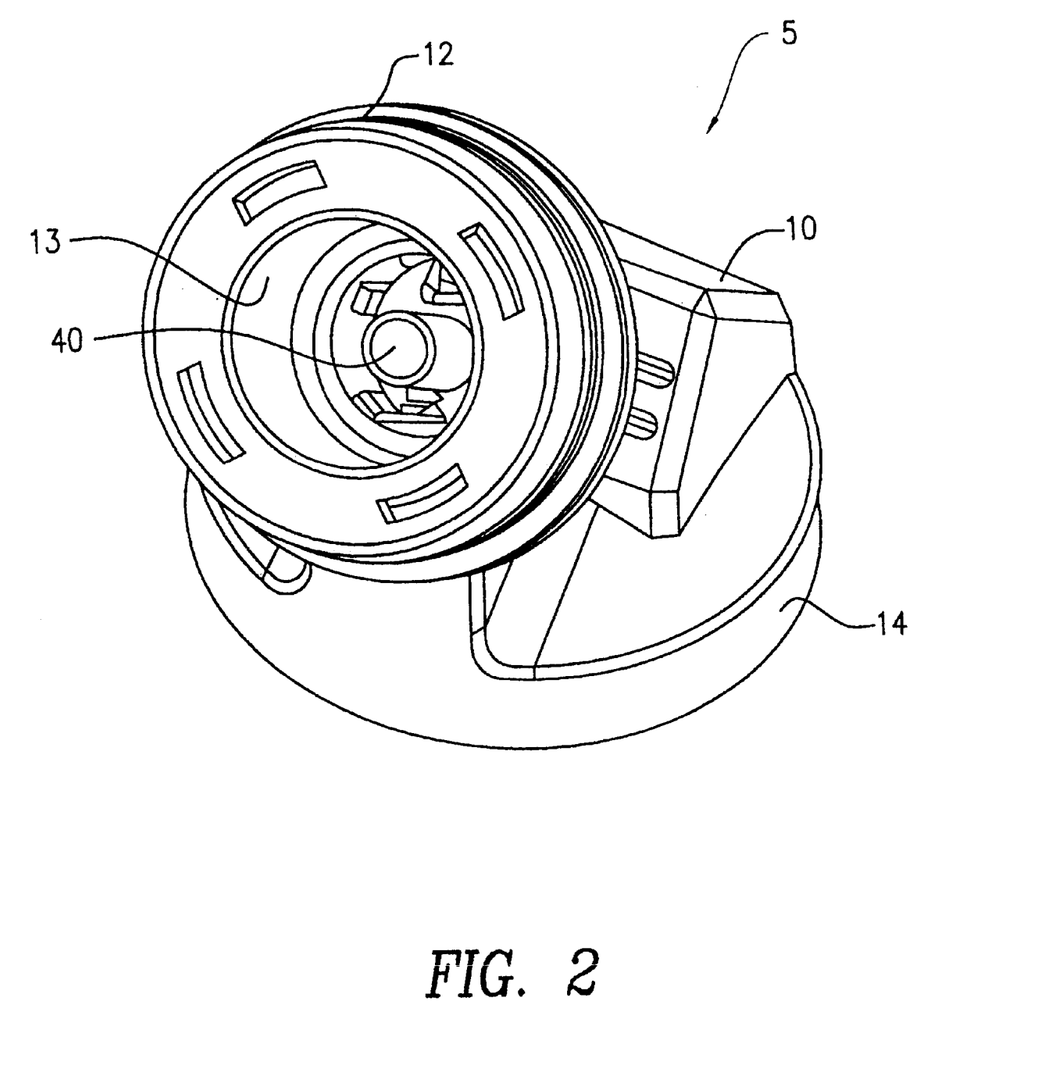
FIG. 2 is a front perspective view of the device of FIG. 1.

The specific container adapter 5 shown in FIGS. 1 and 2 is meant to be attached to a pressurized can of chemicals and an automotive service port so that the chemicals may be conveyed into the automotive system. Housing 10 is provided with a dispensing end 12 and a receiving end 14. Dispensing end 12 is attachable to an automotive service port, while receiving end 14 is attachable to the top of a can of chemicals. In the specific example shown in FIGS. 1 and 2, the service port in question is an automobile air conditioner low pressure service port, which fits into well 13 of dispensing end 12. Cap 11 may be provided to cover the dispensing end to prevent dust and debris from entering housing 10 when dispensing end 12 is not connected to a service port.

Figure 3:
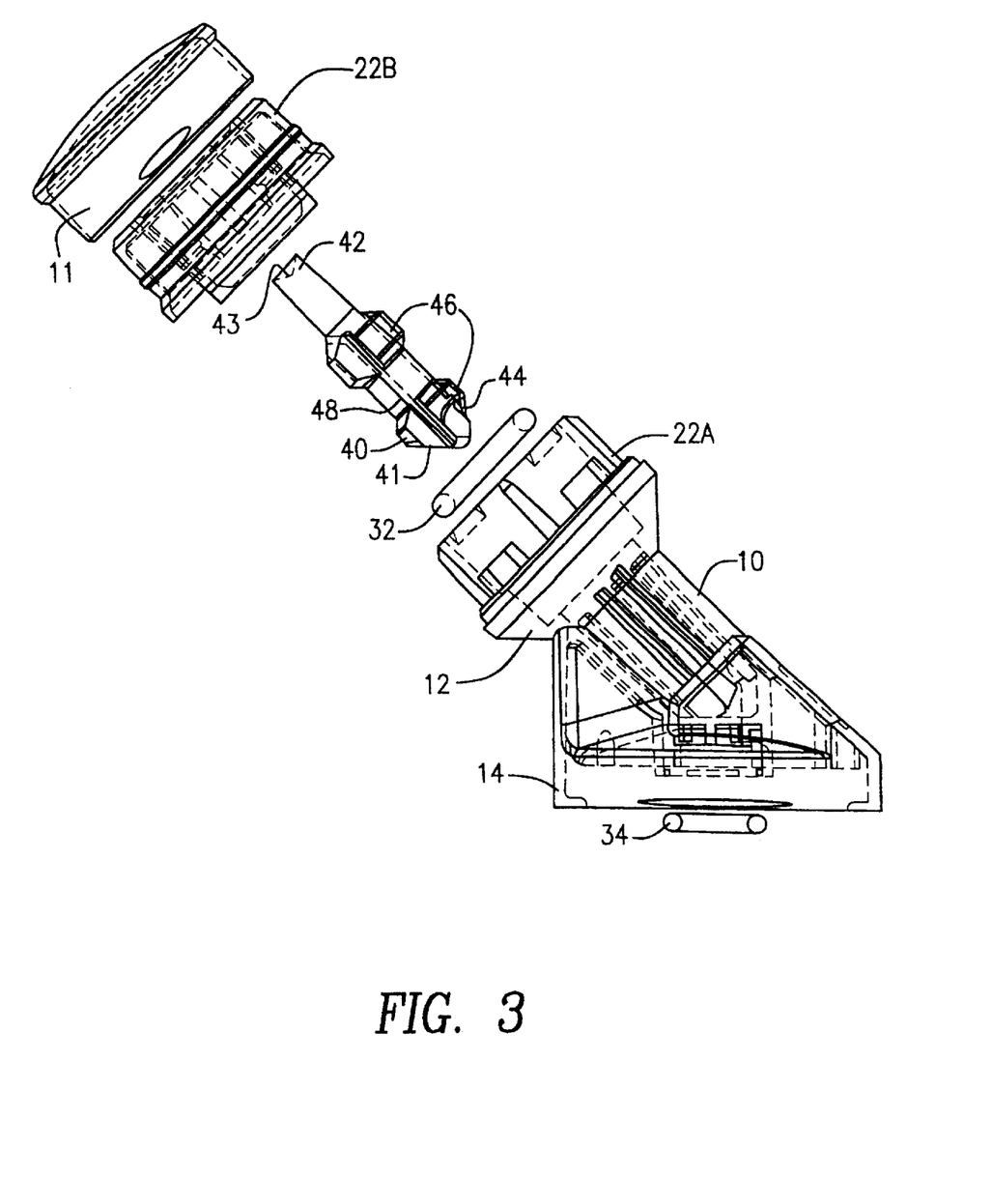
FIG. 3 is an exploded perspective view of a container adapter in accordance with the invention.

As shown in FIG. 3, dispensing end 12 includes hub 22A, which is preferably integrally formed with housing 10, and socket 22B, which fits around hub 22A. Sandwiched between hub 22A and socket 22B is O-ring seal 32. Seal 32 provides a fluid-tight seal against a service port that is inserted within well 13 so that the chemicals exiting from the housing pass into the service port and do not leak out. That O-ring seal 32 is captured between socket 22B and hub 22A enables the invention to be manufactured much more easily and cheaply than the conventional hose with brass fittings. Working with brass, it is much more difficult to insert an O-ring into a rigid single piece of brass.

A similar O-ring seal 34 is provided at receiving end 14 so as to insure that chemicals exiting from the container all pass into housing 10 instead of leaking out.

Figure 4:
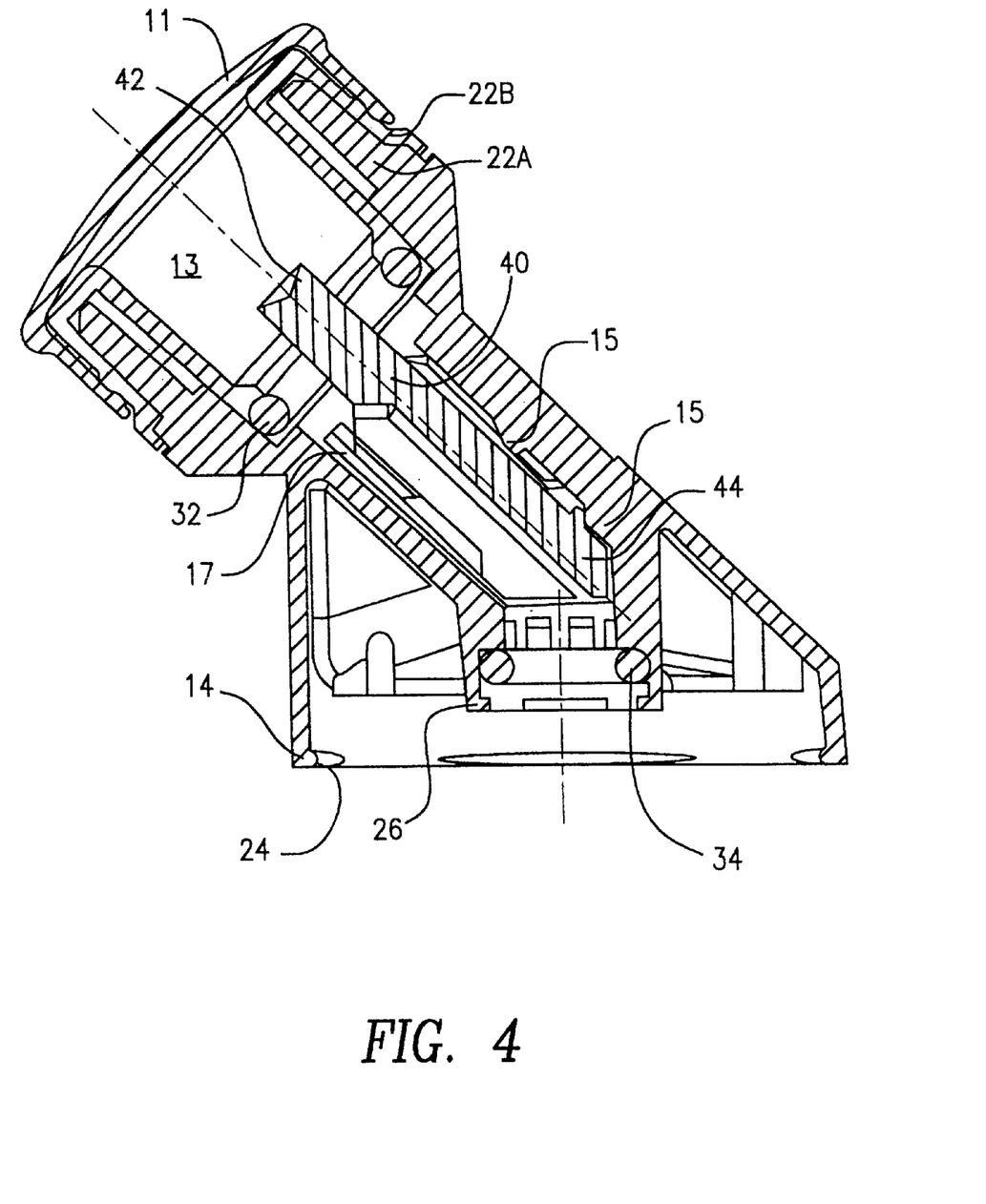
FIG. 4 is a sectional view of a container adapter in accordance with the invention.
Figure 5:
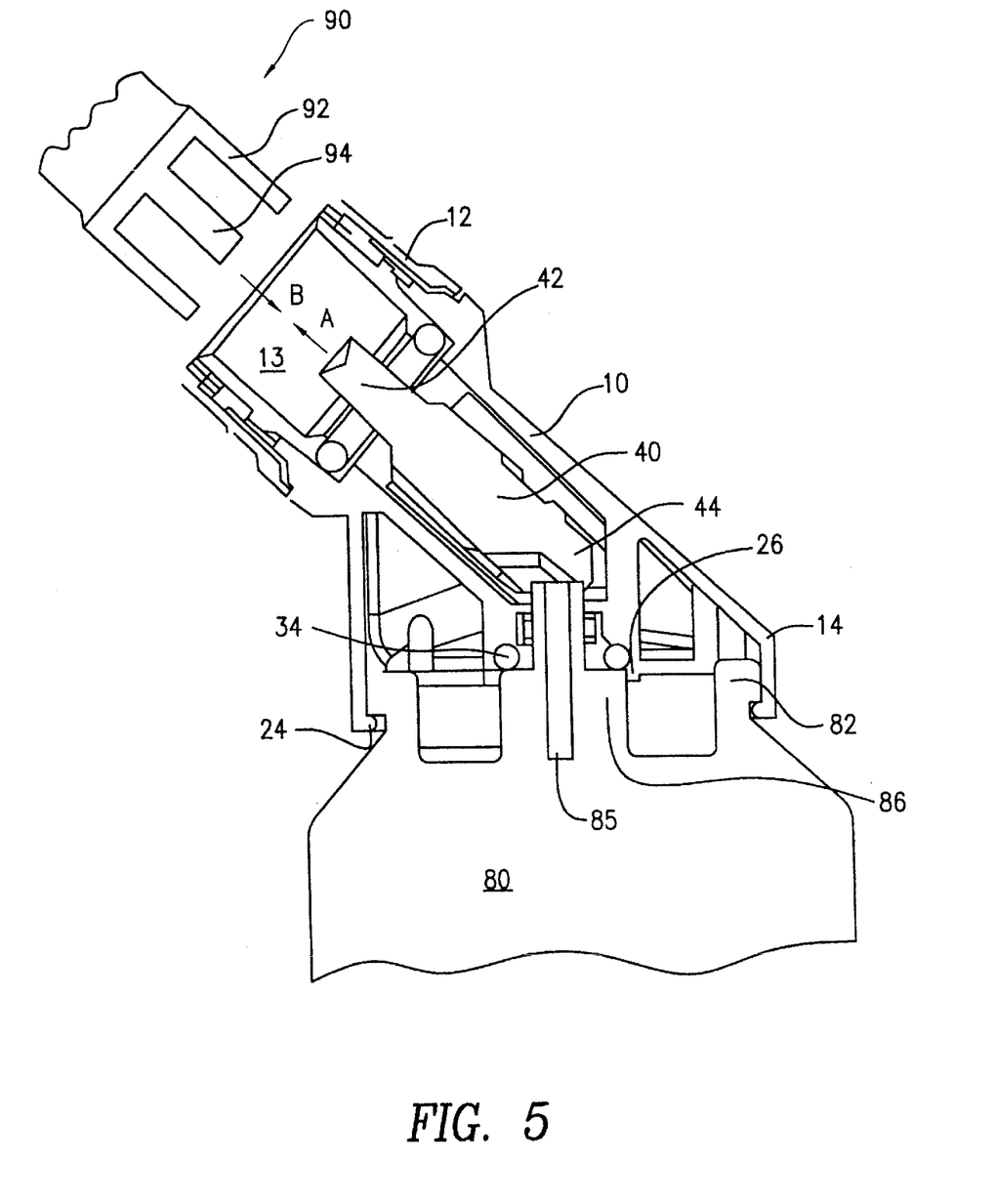
FIG. 5 is a schematic sectional view of a container adapter in accordance with the invention in place on a container.

Housing 10 is provided with an interior space (i.e., it is at least partially hollow) in which core depressor 40 is disposed (see FIGS. 3–5). Distal end 42 of core depressor 40 extends into well 13 of dispensing end 12, while proximal end 44 is closer to receiving end 14. The extreme tip of distal end 42 may be provided with a divot 43, and receiving end 44 may be provided with a flat surface 41, for reasons which will be explained below. Core depressor 40 includes projections 46 which serve to limit the movement of the core depressor. That is, when projections 46 abut internal projections 15 of housing 10, core depressor 40 is prevented from moving further in a given direction. This structure helps to retain core depressor 40 within housing 10. Projections 46 also may ride along one or more internal grooves 17 formed in the interior of housing 10; in this way, the orientation of the core depressor is always maintained and the reciprocal motion of the core depressor is made smooth.

It is preferred that receiving end 14 be made to simply snap onto a pressurized container in a manner that is secure and reassures the user that the attachment is secure. As shown in FIGS. 4 and 5, an outer lip 24 is provided to snap onto and under shoulder 82 of container 80. Similarly, inner lip 26 is provided to snap onto and under a flange (not shown) of valve housing 86. The positive lock of lips 24 and 26 insures that the adapter will not accidentally slip off of a container during use.

FIG. 5 demonstrates the preferred embodiment in use. An automobile air conditioner service port 90 is shown in schematic view to have an outer housing 92 and a centrally disposed valve pin 94. The adapter is first placed on container 85, and valve stem 85 pushes upwards on surface 41 of core depressor 40. Stem 85 pushes upwards for at least one of two reasons: a) the contents of container 80 are pressurized, and b) valve stem 80 is typically spring-biased closed, i.e., upwards in FIG. 5. Core depressor 40 is thus pushed upwards in the direction of arrow A so that distal end 42 extends further into well 13.

When the consumer is ready to charge the automotive system in question (in this example, the automobile air conditioner), the user places dispensing end 12 around service port 90 so that housing 92 enters well 13 in the direction of arrow B. Valve pin 94 abuts distal end 42; divot 43 may be provided to help capture and/or retain valve pin 94 to prevent the valve pin from slipping out of engagement with core depressor 40. By forcing the adapter onto the service port, the user causes valve pin 94 to be pushed back into service port 90 and also causes core depressor 40 to be pushed downward towards receiving end 14. This motion causes surface 41 to bear against container valve stem 85 and push it downward into can 80, thereby opening the valve on the container. Thus, the adapter opens both the service port valve and the container valve at substantially the same time, simply by placing adapter dispensing end 14 around service port 90. With both valves open, the chemicals inside the container leave the container and enter the automotive system via the adapter and the service port. Longitudinal grooves 48 (see FIG. 3) may be provided in core depressor 40 to allow the chemicals to flow more easily through the interior volume of housing 10.

Typically, the service port is either sticking upwards from the automotive system or is substantially horizontal (i.e., sticking out roughly parallel to the ground). As such, the angle of the housing with respect to receiving end 14 causes container 80 to be upended at an angle, preferably approximately 45°, so that the chemicals can exit the container not only because they are under pressure but because of gravity as well. The result is that the container will be able to be emptied to a much greater degree than with the use of the conventional hose.

Figure 6:
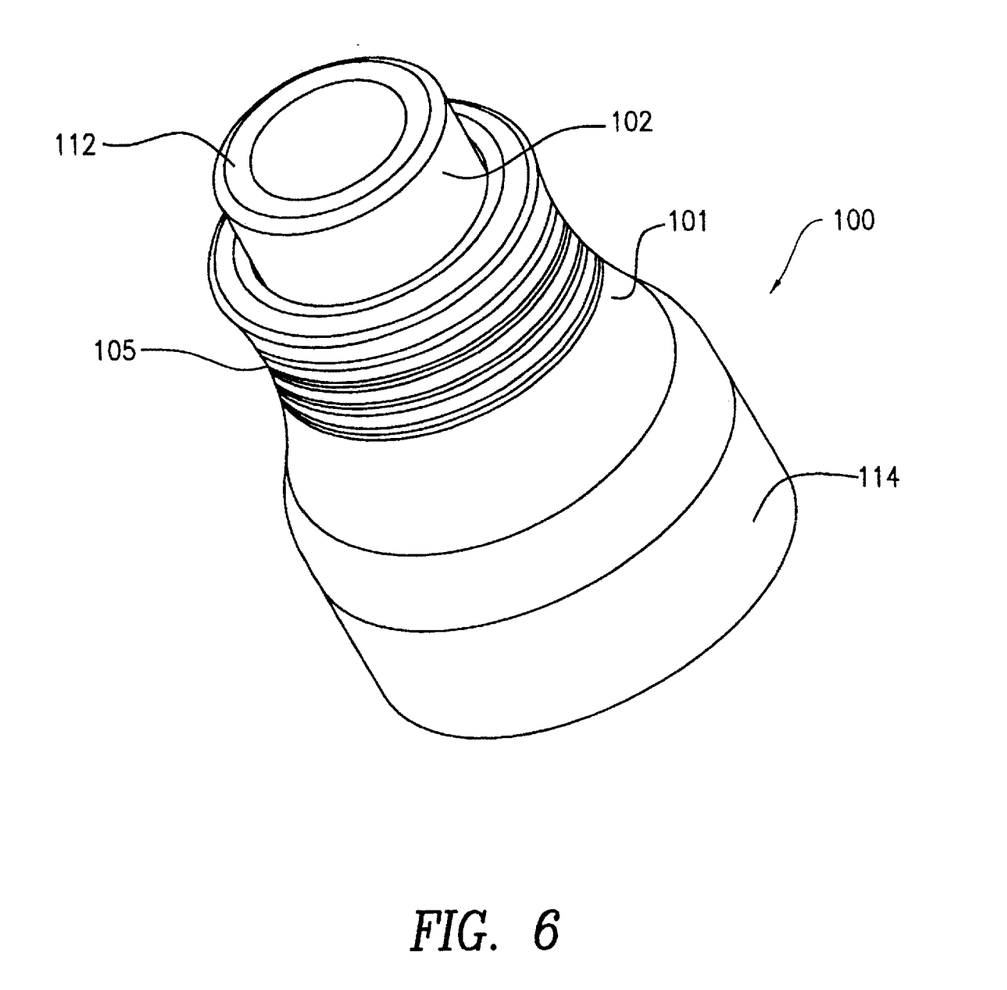
FIG. 6 is a perspective view of an alternative embodiment of the invention.
Figure 7:
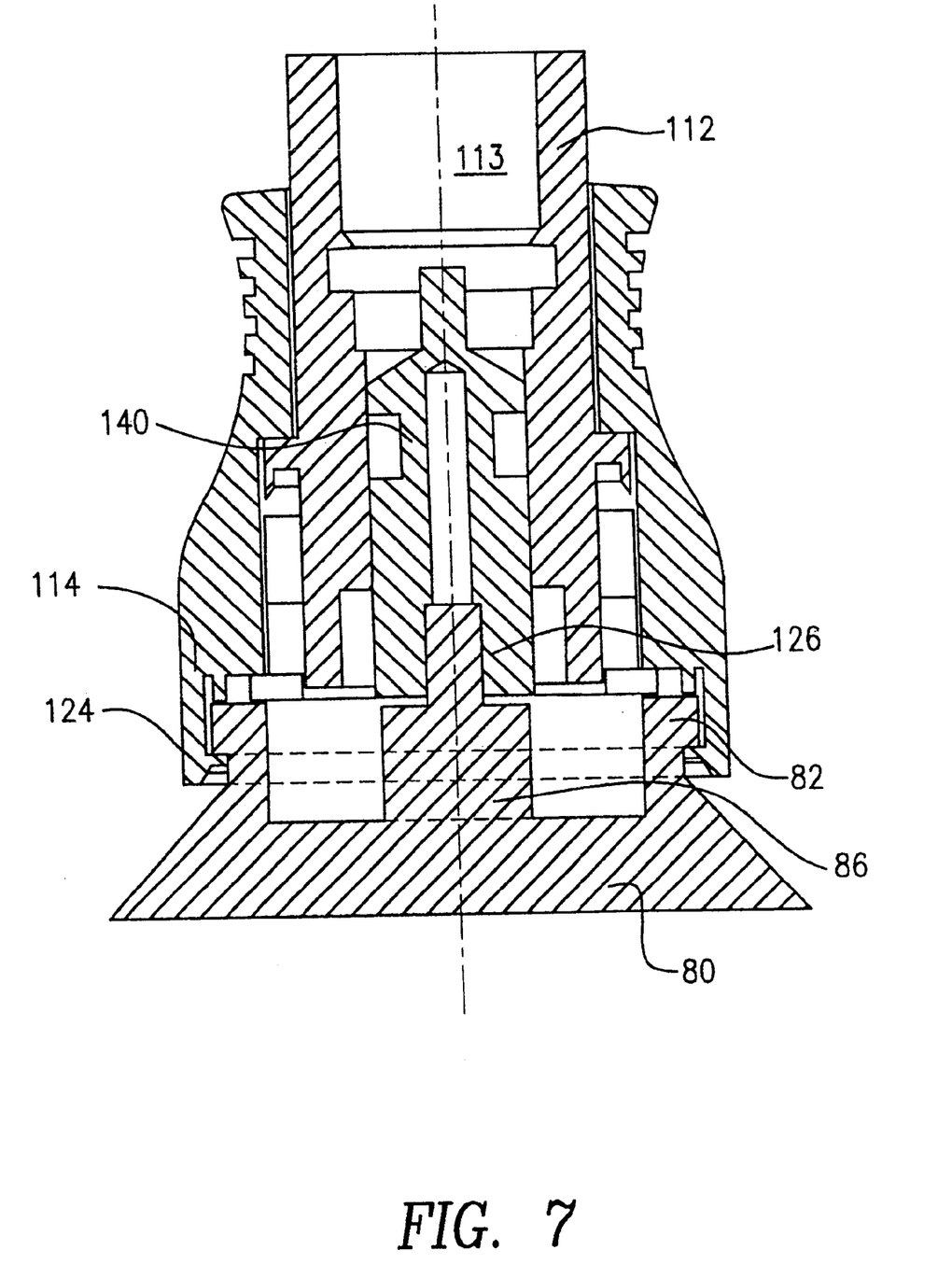
FIG. 7 is a sectional view of the embodiment of FIG. 6.

The preferred embodiment described above and shown in FIGS. 1–5 has an angled housing 10. An alternative embodiment is shown in FIGS. 6 and 7. Adapter 100 provides a substantially straight flow path for the chemicals from the container through its housing to the service port. In the embodiment shown in FIGS. 6 and 7, the body of adapter 100 is made up of two concentric housings, outer housing 101 and inner housing 102. Outer housing 101 may be provided with ribs 105 to assist in the grip of adapter 100 during use. Overall, the housings include a dispensing end 112, substantially similar to dispensing end 12 of the angled embodiment, and a receiving end 114 substantially similar to receiving end 14 of the angled embodiment. Dispensing end 112 includes a well 113 for receiving a service port. Receiving end.1 14 includes outer lip 124 which snaps onto and under shoulder 82 of container 80. Similarly, inner lip 126 is provided to snap onto and under a flange (not shown) of valve housing 86. Core depressor 140 is provided in the interior volume of inner housing 102 in a similar manner to that of core depressor 40.

The embodiment of FIGS. 6–7 is shown with inner housing 102 being movable with respect to outer housing 101. A spring (not shown) may be provided to bias inner housing 102 upwards away from receiving end 114. However, the two housings may be fixed with respect to each other and still fulfill the objects of the invention.

Figure 8:
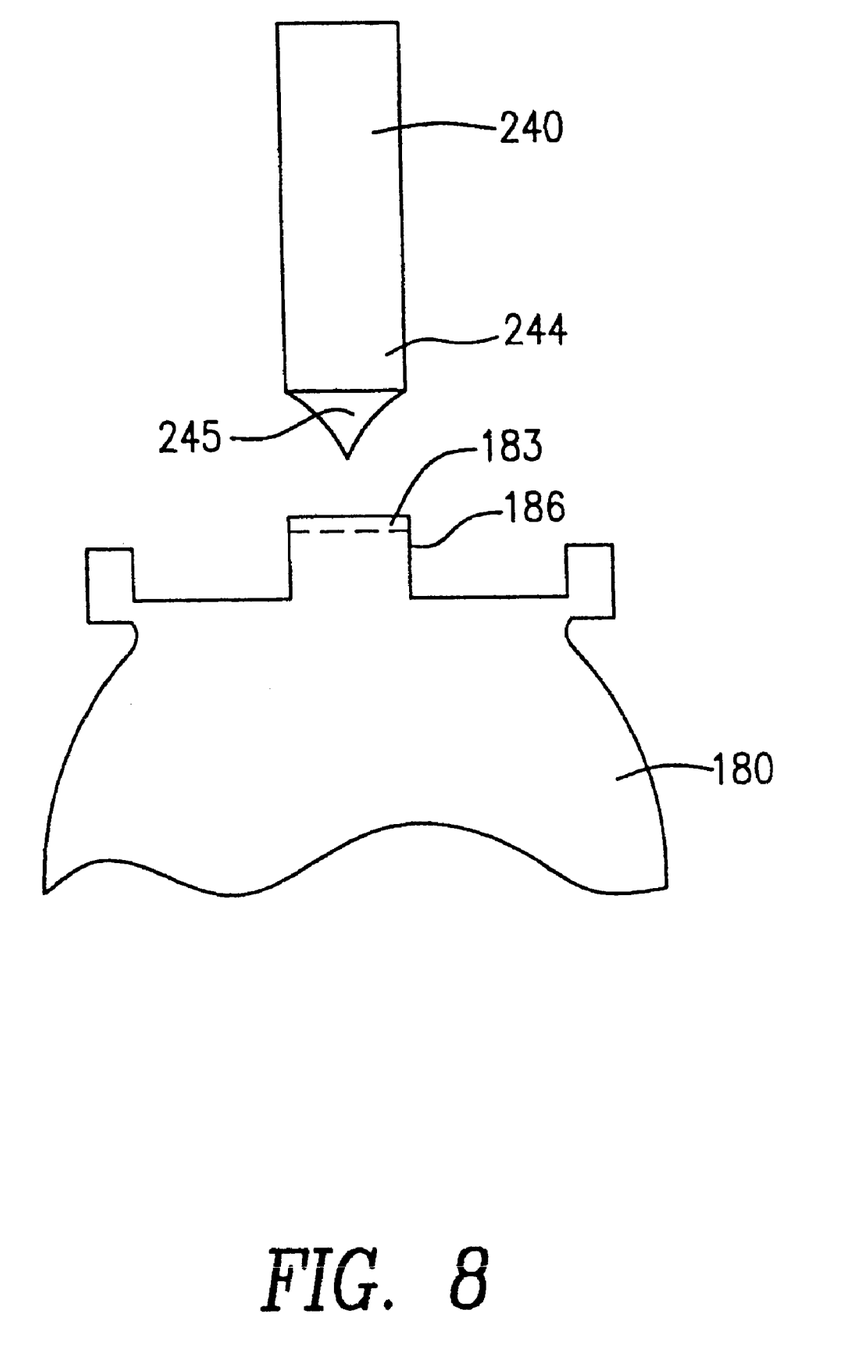
FIG. 8 is a side schematic view of an alternative core depressor in accordance with the invention.

In both of the above embodiments, a lower surface of the core depressor (40 or 140) pushes down on stem 85 of a valve in container 80. However, some containers do not have a valve with a stem. Instead, as noted above, some containers have a puncture valve. So that the invention may accommodate such containers as well as those having stem valves, an alternative version of the core depressor is shown in FIG. 8. Core depressor 240 has a proximal end 244 which includes a piercing pin 245. When the adapter 5 or 100 is placed on a container 180 and then fitted onto a service port, core depressor 240 is forced downward, and piercing pin 245 punctures seal 183 on valve 186. When the seal is punctured, the chemicals inside container 180 escape into the system in the same way as with the above embodiments. The alternative core depressor shown in FIG. 8 may be used with either the angled embodiment of FIGS. 1–5 or the straight embodiment of FIGS. 6 and 7.

Having described several embodiments of the invention, it is to be understood that the description is not meant as a limitation excluding such further variations or modifications as may be apparent or may suggest themselves to those skilled in the art. It is intended that the present invention cover such variations and modifications as fall within the scope of the claims appearing hereinbelow.

What is claimed is:

1. A dispensing adapter for pressurized containers, comprising:

a housing having a dispensing end, a receiving end, and an interior volume communicating between said dispensing end and said receiving end, said receiving end being adapted to sealingly engage a first valve of a pressurized container, and said dispensing end being adapted to sealingly engage a second valve of a service port; and a freely moveable core depressor moveably disposed in said interior volume having a proximal end disposed closer to said receiving end and a distal end disposed closer to said dispensing end, wherein when said core depressor is moved toward said receiving end of said housing, said proximal end of said core depressor pierces the first valve and opens the container.

2. A dispensing adapter for pressurized containers according to claim 1, wherein when said dispensing end of said housing is attached to the second valve, said second valve engages said distal end of said core depressor and said core depressor is moved toward said receiving end of said housing.

3. A dispensing adapter for pressurized containers according to claim 2, wherein the second valve is an automobile air conditioner service port, the service port having a port valve stem.

4. A dispensing adapter for pressurized containers according to claim 3, wherein when said housing is attached to both the first and second valves, said distal end of said core depressor engages the port valve stem and said proximal end of said core depressor pierces the container valve.

5. A dispensing adapter for pressurized containers according to claim 1, wherein said receiving end comprises a positive lock grasping the pressurized container, said positive lock comprising a lip which frictionally engages a shoulder of the pressurized container.

6. A dispensing adapter for pressurized containers according to claim 1, said core depressor further comprising longitudinal fluid flow grooves, wherein when the first valve is pierced, at least part of the fluid in said pressurized container the container, travels at least partially along said longitudinal fluid flow grooves, and exits said housing via said dispensing end.

7. A dispensing adapter for pressurized containers according to claim 1, wherein said receiving end is substantially flat and said housing is angled with respect to said receiving end.

8. A dispensing adapter for pressurized containers according to claim 7, wherein said housing is angled at approximately 45° with respect to said receiving end.

9. A dispensing adapter for pressurized containers according to claim 1, wherein said housing is substantially straight.

10. A dispensing adapter for pressurized containers according to claim 1, wherein said dispensing adapter is made of plastic parts.

11. A dispensing adapter for pressurized containers according to claim 10, wherein said dispensing adapter comprises a unitary plastic assembly of said plastic parts.

12. A dispensing adapter for pressurized containers according to claim 1, wherein said moveable core depressor is reciprocally moveable.

* * * * *